United States Patent [19]

Humphreys

[11] Patent Number: 4,563,221

[45] Date of Patent: Jan. 7, 1986

[54] PIGMENTS AND THEIR MANUFACTURE

[75] Inventor: John P. Humphreys, Hartlepool, England

[73] Assignee: Tioxide Group PLC, London, England

[21] Appl. No.: 712,040

[22] Filed: Mar. 15, 1985

Related U.S. Application Data

[63] Continuation-in-part of Ser. No. 553,958, Nov. 21, 1983, abandoned.

[30] Foreign Application Priority Data

Dec. 16, 1982 [GB] United Kingdom ............... 8235870

[51] Int. Cl.$^4$ ........................... C09C 3/00; C09C 1/36
[52] U.S. Cl. .............................. 106/300; 106/308 F; 106/308 S
[58] Field of Search ............... 106/300, 308 F, 308 S

[56] References Cited

U.S. PATENT DOCUMENTS

| | | | |
|---|---|---|---|
| 2,479,836 | 8/1949 | Hoback et al. | 106/308 F |
| 4,098,758 | 7/1978 | Monte et al. | 106/300 |
| 4,246,040 | 1/1981 | Okumura et al. | 106/308 B |
| 4,255,375 | 3/1981 | Macpherson et al. | 264/117 |
| 4,283,316 | 8/1981 | Bonsignore | 524/322 |

FOREIGN PATENT DOCUMENTS 6400010 1/1964 Netherlands ............... 106/308 F

Primary Examiner—John Kight
Assistant Examiner—Garnette D. Draper
Attorney, Agent, or Firm—Banner, Birch, McKie & Beckett

[57] ABSTRACT

Pigments for use in plastics should produce a composition containing as few nibs or aggregates as is possible and also develop as little dust as possible during handling.

A new pigment has now been developed which comprises particulate titanium dioxide having an organic coating of isostearic acid, dodecyl benzene sulphonic acid and a cationic emulsifying agent of a fatty alkyl amine. The pigment particles should be free of an inorganic coating.

A method of manufacture of the pigment is disclosed in which the isostearic acid and dodecyl benzene sulphonic acid are emulsified in water prior to addition of an aqueous dispersion of the pigment. Remarkably it has been discovered that after treatment the pigment does not require milling in a fluid energy mill and that separation from the supernatant liquid can be effected by decantation.

10 Claims, No Drawings

PIGMENTS AND THEIR MANUFACTURE

This is a continuation-in-part of application Ser. No. 553,958, filed Nov. 21, 1983, now abandoned.

This invention relates to an improved pigment and a method for its manufacture.

Titanium dioxide pigment has many uses in industry in the manufacture of pigmented materials such as paints, plastics composition, rubber composition and others. It is desirable that the pigment should be relatively dustless and easy to disperse in compositions and have few hard aggregates (or nibs). The presence of aggregates can spoil the appearance of a film of paint in which the pigment is present. It is desirable also that such a pigment should require a minimum number of manufacturing stages.

According to the present invention a pigment comprises particulate titanium dioxide free of an inorganic coating but treated with a cationic emulsifying agent of a fatty alkyl amine in which the alkyl chain contains from 8 to 22 carbon atoms and isostearic acid and dodecyl benzene sulphonic acid, said isostearic acid being present in an amount of from 0.1 to 10% by weight of the pigment and said dodecyl benzene sulphonic acid being present in an amount of from 1 to 25% by weight of the isostearic acid and said cationic emulsifying agent being present in an amount of from 50% to 250% by weight of isostearic acid.

According to the invention also a method for the manufacture of a pigment comprises (A) forming an aqueous dispersion of pigmentary titanium dioxide free of an inorganic coating.

(B) forming an aqueous emulsion containing (1) isostearic acid in an amount of up to 50% by weight of said emulsion and (2) dodecyl benzene sulphonic acid in an amount of up to 25% by weight of said isostearic acid, and (C) adding a cationic emulsifying agent formed from a fatty alkyl amine in which the alkyl chain contains from 8 to 22 carbon atoms and said aqueous emulsion to said aqueous dispersion of pigmentary titanium dioxide, said emulsion being added to said dispersion in an amount sufficient to introduce (1) from 0.1 to 10% by weight of isostearic acid on weight of pigment and (2) dodecyl benzene sulphonic acid in an amount of from 1 to 25% on the weight of isostearic acid and said amount of the cationic emulsifying agent added being from 50% to 250% by weight of the isostearic acid.

The present invention constitutes an important advance in pigment technology. The new pigment is free of an inorganic coating and has associated therewith isostearic acid, dodecyl benzene sulphonic acid and the specified cationic emulsifying agent. The new pigment has a reduced tendency to dust, is easily dispersible in plastics media with few grits or nibs being present and requires fewer manufacturing stages in its production. For instance being free of inorganic coating there is no requirement for the usual inorganic wet coating stages to be carried out and also usually advantageously there is no requirement to mill the pigment in a fluid energy mill. Also the efficiency of flocculation is such that filtration of the suspension is not usually required and normally only decantation is needed.

Generally speaking the pigment of the invention is prepared by a method which involves forming an emulsion of the isostearic acid with a specified surface active agent which is dodecyl benzene sulphonic acid and adding the emulsion to an aqueous dispersion of the pigment to which the cationic emulsifying agent is also added. It has also been found that heating of the pigment dispersion to a temperature within the range 30° C. to 80° C. is advantageous. The treated pigment is then separated and dried. The pigment can be flocculated and separated or the aqueous suspension can be spray dried to effect the separation and drying.

The titanium dioxide pigment of the present invention can be anatase titanium dioxide or rutile titanium dioxide and can be made by the long established "sulphate" process or by the more recently developed "chloride" process. Preferably the pigment is rutile pigment prepared by the "chloride" process (sometimes named "pyrogenic titanium dioxide pigment").

The titanium dioxide pigment chosen is free of any so-called inorganic coating. Hitherto it has been the usual practice to coat or to treat pigments with one or more oxides or hydrous oxides of metals such as aluminium, titanium, cerium, zirconium, or with silicates or phosphates and now it has been found that the presence of such inorganic coating is actually detrimental to the effect of the treatment according to the invention.

The amount of isostearic acid in association with the pigment usually is from 0.10% to 10% by weight of the pigment and preferably the amount is from 0.4 to 2.5% by weight. The amount of the dodecyl benzene sulphonic acid usually is from 1% to 25% by weight of the isostearic acid with from 4% to 7% being preferred.

The term isostearic acid in its strictest definition means 16-methylheptadecanoic acid and whilst this acid falls within the definition of acids usable under this invention there are also included mixtures of $C_{18}$ saturated fatty acids of general formula $C_{17}H_{35}COOH$ which have become indistinguishable in the art from the strictest defined acid. The isostearic acids of either definition are liquids and as such are easily formed into aqueous emulsions.

In the method for the manufacture of the pigments in accordance with the invention the isostearic acid is emulsified in water together with the dodecyl benzene sulphonic acid prior to addition to the dispersion of the pigment. Typically the emulsion contains up to 50 percent by weight isostearic acid and the appropriate proportion of dodecyl benzene sulphonic acid say up to 25% by weight of the weight of isostearic acid.

A cationic emulsifying agent of a fatty alkyl amine, e.g. of a primary amine, a diamine or a quaternary amine is also added to the dispersion of the pigment. The particular amines used are those in which the alkyl chain contains from 8 to 22 carbon atoms. Usually when the pigment dispersion is cationic the emulsifying agent is added before the emulsion of the isostearic acid but the latter is usually added first when the dispersion is anionic.

The amount of the cationic emulsifying agent depends on the amount of the isostearic acid and generally speaking the amount will be from say 50% to 250% by weight of the isostearic acid. The emulsifying agent is most usefully in the form of a salt of the amine such as the acetate.

After mixing of the organic treating agents of the invention with the aqueous dispersion of the titanium dioxide pigment it is usual, though not essential, to add to the mixture a quantity of an inorganic base to produce a pH in the dispersion of from 7 to 8. Usually an alkali is added to effect this increase in pH and most preferred is an aqueous solution of ammonia.

The treated titanium dioxide slurry is flocculated, if desired, after the addition of the isostearic acid, the dodecyl benzene sulphonic acid and emulsifying agent, usually by adjustment of the pH of the slurry by addition of the alkali. The degree of flocculation is generally so good that the supernatent liquid is clear and visibly free of particles of pigment. The liquid may be decanted from the pigment and no filtering is required.

The separated pigment is dried or separation and drying can be effected in one operation in a spray drier.

The invention is illustrated in the following Examples.

EXAMPLE 1

Titanium dioxide reactor discharge obtained from the vapour phase oxidation of titanium tetrachloride was sand milled. An aqueous dispersion of the pigment was used containing 300 grams per liter and having a pH of 2.9.

One liter of the aqueous dispersion was heated to 70° C. and agitated throughout the treatment process.

An emulsion of isostearic acid in water was prepared by stirring in the presence of dodecyl benzene sulphonic acid. The amounts of isostearic acid and dodecyl benzene sulphonic acid in the emulsion were 100 grams per liter and 5 grams per liter respectively.

An amount of the prepared emulsion equivalent to that containing 1.5% by weight isostearic acid on weight of pigment was added to the stirred aqueous dispersion of pigment and the dispersion stirred for 15 minutes prior to the addition of aqueous ammonium hydroxide solution (0.88 $NH_4OH:H_2O = 1:9$) in an amount sufficient to produce a pH in the dispersion of between 7.5 and 8.0.

The flocculated suspension settled on standing and after decantation of the supernatant liquor the treated pigment was dried in an oven at 110° C. The pigment is free of a cationic emulsifying agent.

EXAMPLE 2

Example 1 was repeated except that prior to the addition of the aqueous emulsion of isostearic acid and dodecyl benzene sulphonic acid there was added to the dispersion of the pigment a solution of fatty acid amine. The fatty acid amine was dissolved in dilute acetic acid and thus had the general formula $(RNH_2(CH_2)_3NH_3)^{++} 2(CH_3COO)^-$ in which R represents an alkyl group derived from oleic acid. The fatty acid amine is sold under the Trade Name DUOMEEN O by Akzo Chemie. The solution of the amine contained 100 grams per liter of the acetate and was added in an amount sufficient to introduce 1.2% by weight of amine acetate on weight of pigment.

The amount of aqueous emulsion added to the aqueous dispersion of the pigment was sufficient to introduce 0.6% by weight of isostearic acid on weight of pigment.

EXAMPLE 3

To the aqueous dispersion of sand milled rutile titanium dioxide used in Examples 1 and 2 there was added a solution of aluminium sulphate containing 88 grams per liter of the sulphate when expressed as $Al_2O_3$ in an amount sufficient to introduce 1% by weight $Al_2O_3$ on pigment. After stirring for 15 minutes an aqueous solution of sodium hydroxide (containing 110 grams per liter NaOH) was added to the dispersion to raise the pH to a value of from 7.5 to 8.0. The dispersion was stirred for a further 15 minutes and then filtered and the product dried. No treatment with isostearic acid took place. The product was titanium dioxide coated with a hydrous oxide of aluminium.

EXAMPLE 4

Example 3 was repeated except that the product was not separated but used as the starting dispersion of the process as described in Example 1.

The aqueous dispersion after mixing with the aqueous emulsion of isostearic acid and dodecyl benzene sulphonic acid was neutralised with sodium hydroxide solution in place of the aqueous ammonium hydroxide solution.

EXAMPLE 5

The experiment described in Example 4 was repeated except instead of sodium hydroxide solution there was used in both neutralisation stages the aqueous ammonium hydroxide solution.

EXAMPLE 6

The procedure of Example 5 was repeated except that the first neutralisation stage after mixing with the aluminium sulphate was omitted.

The products of all six Examples were separately mixed with polyethylene in an internal mixer in an amount such that the masterbatch prepared contained 60% by weight of the pigment. A portion of the masterbatch was heat-pressed and, under the influence of further heat, blown into a thin film. The films were illuminated and the number of aggregates per unit weight of pigment was determined by counting the number of aggregates in an area of film which was subsequently weighed.

It was observed that films of equal thickness containing pigment of Examples 3, 4, 5 and 6 contained about 6 to 7 times the number of aggregates of pigment present in film containing the treated pigment of Example 1. It was also observed that the film containing the pigment of Example 2 contained approximately half the aggregates of that containing the pigment of Example 1.

Thus treatment of uncoated pigments with isostearic acid, dodecyl benzene sulphonic acid and with the cationic emulsifying agent is valuable. It was also observed in the case of the pigment of Example 2, that the film contained fewer aggregates than films containing current commercially acceptable pigments which have been milled in fluid energy mills during their manufacture.

EXAMPLE 7

Titanium dioxide reactor discharge obtained from the vapour phase oxidation of titanium tetrachloride was formed into an aqueous dispersion and milled in a sand mill.

To an amount of the dispersion containing 135 kilograms of titanium dioxide at a concentration of 850 grams per liter there was added 1.62 kilograms of the acetate formed by dissolving the fatty acid amine referred to in Example 2 in dilute acetic acid to form a 20% by weight solution. The mixture was agitated to effect admixture and there was then added an emulsion of isostearic acid (200 grams per liter) and dodecyl benzene sulphonic acid (5 grams per liter) as prepared in Example 1 in total amount sufficient to provide 0.81 kilograms of isostearic acid. After the addition of the emulsion had been completed the pH of the dispersion was 3.2. The pigment was observed to be dispersed well.

The dispersed pigment was fed in the form of the aqueous dispersion to a spray drier and the dried product was non-dusting and had good flow properties.

The pigment was tested as described previously by forming into a 60% by weight masterbatch with polyethylene of flow index of 7 and thin blown films prepared. The films were compared with similar films containing current commercially available pigments which had been fluid energy milled and it was observed that the new pigment of Example 7 introduced as much as 33% fewer aggregates. A substantial and noticeable improvement was apparent.

EXAMPLE 8

In this example three pigments were prepared from a calcined rutile titanium dioxide pigment obtained by the sulphate process. The calciner discharge was micropulverised, dispersed in water with 0.2% by weight of pigment of monoisopropanolamine, wet milled and hydroclassified similar to the procedure described in U.S. Pat. No. 2,479,836. The initial concentration of the titanium dioxide dispersion was 230 gpl and the initial batch size was 1 kg.

Treated Pigment A

Treated pigment A was treated with lauric acid/morpholine to yield titanium dioxide carrying 1% lauric acid and was subsequently treated with an inorganic coating as described in U.S. Pat. No. 2,479,836 in Example 17. The particular procedure employed involved initial preparation of the mixture of lauric acid and morpholine and this was obtained by mixing 20 grams lauric acid with 8.7 grams morpholine. This mixture was then dissolved in water by adding water in an amount to bring the batch weight to 200 grams thereby yielding a solution containing 10% w/w lauric acid. The treatment of the pigment dispersion was carried out in a beaker equipped with an agitator at a temperature of 24° C. The initial batch of dispersed titanium dioxide pigment was mixed with the lauric acid solution in an amount equivalent to introduce 1% lauric acid on pigment by weight.

The mixture was then agitated for 10 minutes. Magnesium sulphate equivalent to 0.6% of the weight of the pigment was added to the mixed dispersion and this flocculated the titanium dioxide pigment which was allowed to settle and was concentrated by decantation of the clear supernatant liquor from the pigment. Foaming was evident after the magnesium sulphate addition and the pH at this stage was 7.6.

Titanium sulphate solution equivalent to 0.3% $TiO_2$ on the weight of pigment was then added and the mixture agitated for 15 minutes. The dispersion had a pH value of 3.8. Zinc sulphate solution was then added to the treated pigment equivalent to an amount of 0.33% ZnO based on pigment and the mixture was agitated for 15 minutes at a pH of 3.5. A solution of sodium silicate was then added introducing the equivalent of 0.33% $SiO_2$ on the weight of the pigment and the mixture agitated for 15 minutes at a pH of 4.2. Aluminium sulphate solution equivalent to 1.0% $Al_2O_3$ on the weight of pigment was then added and the mixture stirred for 15 minutes at a pH of 2.3.

The pH of the mixture was then adjusted to 7.2 through the addition of solutions of sodium hydroxide and sodium carbonate and stirred for a further 30 minutes. The treated pigment carrying the lauric acid and precipitated inorganic coatings was filtered, washed with demineralised water until free of salts and dried at a temperature of 115° C. The dried cake was then crushed and micropulverised.

Treated Pigment B

This pigment was prepared in accordance with the present invention and the batch of untreated titanium dioxide pigment as used for the preparation of pigment A was heated under agitation to 50° C. An emulsion of isostearic acid in water was prepared as described in Example 1 in the presence of dodecyl benzene sulphonic acid. The emulsion was added to the agitated pigment dispersion in an amount equivalent to introduce 0.6% isostearic acid on the weight of pigment. The mixture was then stirred for 15 minutes. It was noted that the pigment was well dispersed throughout the solution at a pH of 8.3. A solution of a fatty acid amine as described in Example 2 was then added to the dispersion in an amount sufficient to introduce 1.2% by weight of the fatty acid amine as the acetate on weight of pigment. The mixture was stirred for 15 minutes during which time flocculation of the dispersion occurred and the pH was reduced to 7.1 through the addition of the fatty acid amine solution. A solution of ammonia was then added to adjust the pH to 7.8. The dispersion was then filtered to separate the treated pigment B which was washed and dried at 115° C. The obtained pigment B was crushed and micropulverised.

Treated Pigment C

This treated pigment C was prepared in a manner analogous with treated pigment B except that the fatty acid amine solution was replaced by an aqueous solution of morpholine in a quantity equivalent to the fatty acid amine.

Treated pigments A, B and C were then evaluated as to their dispersibility in polyethylene by a method similar to that previously described for the products of Examples 1 to 6. The dispersibility of each treated pigment was expressed as the number of aggregates (or nibs) per gram of pigment and the results are given below.

|  | No. of aggregates per gram |
|---|---|
| Treated Pigment A | 1975 |
| Treated Pigment B | 140 |
| Treated Pigment C | 256 |

It will be seen from the above results that the treated pigment prepared according to the prior art process (Pigment A) had a very large number of aggregates whereas the number of aggregates for the pigment prepared according to the invention, Pigment B, had few aggregates. Pigment C which employed morpholine instead of the fatty acid amine in accordance with the invention also contained twice as many aggregates as the pigment of the invention.

I claim:

1. A pigment comprising particulate titanium dioxide free of an inorganic coating but treated with a cationic emulsifying agent of a fatty alkyl amine in which the alkyl chain contains from 8 to 22 carbon atoms and isostearic acid and dodecyl benzene sulphonic acid, said isostearic acid being present in an amount of from 0.1 to 10% by weight of the pigment and said dodecyl benzene sulphonic acid being present in an amount of from 1 to 25% by weight of the isostearic acid and said cationic emulsifying agent being present in an amount of from 50% to 250% by weight of isostearic acid.

2. A pigment according to claim 1 in which the amount of isostearic acid is from 0.4 to 2.5% by weight of pigment.

3. A pigment according to claim 1 in which the amount of dodecyl benzene sulphonic acid is 4% to 7% by weight of the isostearic acid.

4. A method for the manufacture of a pigment which comprises
   (A) forming an aqueous dispersion of pigmentary titanium dioxide free of an inorganic coating,
   (B) forming an aqueous emulsion containing (1) isostearic acid in an amount of up to 50% by weight of said emulsion and (2) dodecyl benzene sulphonic acid in an amount of up to 25% by weight of said isostearic acid, and
   (C) adding a cationic emulsifying agent formed from a fatty alkyl amine in which the alkyl chain contains from 8 to 22 carbon atoms and said aqueous emulsion to said aqueous dispersion of pigmentary titanium dioxide, said emulsion being added to said dispersion in an amount sufficient to introduce (1) from 0.1 to 10% by weight of isostearic acid on weight of pigment and (2) dodecyl benzene sulphonic acid in an amount of from 1 to 25% on the weight of isostearic acid and said amount of the cationic emulsifying agent added being from 50% to 250% by weight of the isostearic acid.

5. A method according to claim 4 in which the aqueous dispersion is heated to a temperature of 30° C. to 80° C.

6. A method according to claim 4 in which the amount of the aqueous emulsion is such as to provide 0.4% to 2.5% by weight of isostearic acid by weight of pigment.

7. A method according to claim 4 in which the pH of the aqueous suspension after treatment with the aqueous emulsion is raised to a value of 7 to 8 by the addition of an inorganic base.

8. A method according to claim 4 in which the aqueous dispersion is flocculated after treatment with said aqueous emulsion.

9. A method according to claim 8 in which the treated pigment is separated by decantation and then dried.

10. A method according to claim 4 in which the aqueous dispersion of the treated pigment is spray dried.

* * * * *